Nov. 28, 1961 F. W. REYNOLDS 3,011,089
SOLID STATE LIGHT SENSITIVE STORAGE DEVICE
Filed April 16, 1958
FIG. 1
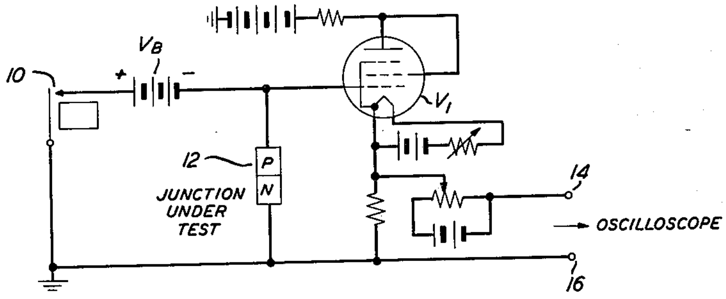
FIG. 2
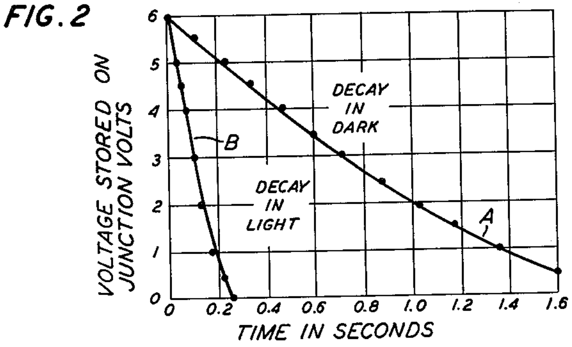
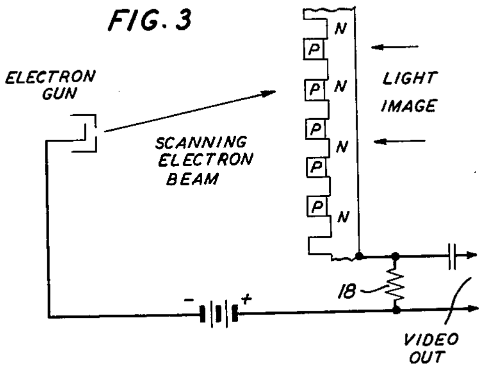
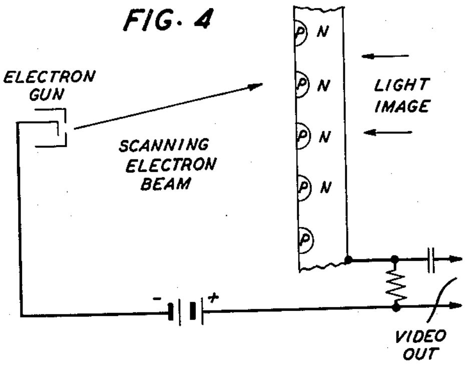
FIG. 5
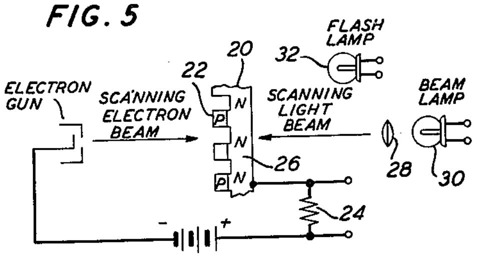
INVENTOR
F. W. REYNOLDS
BY [signature]
ATTORNEY United States Patent Office 3,011,089

Patented Nov. 28, 1961

3,011,089

SOLID STATE LIGHT SENSITIVE STORAGE DEVICE

Frederick W. Reynolds, Ridgewood, N.J., assignor to Bell Telephone Laboratories, Incorporated, New York, N.Y., a corporation of New York Filed Apr. 16, 1958, Ser. No. 729,018

4 Claims. (Cl. 315—10)

This invention relates to light responsive devices and more particularly to light sensitive storage devices or elements.

Storage of information or data is one of the necessary functions in many communication systems and switching systems, as well as in computers and other data handling devices. Although permanent or long term storage is also required, transitory or semipermanent storage is of great importance in all such systems. While many forms of transitory storage are known, particular attention has been directed and is still being directed to the problem of storage devices into which information may be entered or from which it may be withdrawn at high speeds. One of the most common forms of high speed access to stored information involves the use of either light beams or electron beams or both to write in or read out information. These have been combined in such devices as the image Orthicon, the Vidicon picture tube, and the barrier grid tube, all of which suffer from the resulting structural complexity.

It is accordingly the object of the present invention to reduce the complexity and improve the stability of light and/or electron beam responsive storage devices.

According to the invention, an improved storage device fulfilling the above requirements involves a P-N junction or a mosaic made up of a plurality of P-N junctions, together with means for biasing the junctions in the reverse direction. Information to be stored may be applied in the form of light focused on the mosaic or individual junctions and the stored information may conveniently be read out by the use of an electron beam. In addition, the storage device may be cleared or "erased" by either an electron beam or a light beam.

Conduction occurs in electronic semiconductors by means of two types of charge carriers, electrons and holes. Generically, those conductors wherein conduction is in the main by electrons are called N-type, while those wherein conduction is caused by holes are called P-type. The conductivity transition region between two contiguous zones of opposite conductivity type is known as a P-N junction. It is known in the art that P-N junctions are photosensitive. That is, the current flow across the P-N junction can be altered if light is incident thereon, as disclosed in J. N. Shive Patents 2,641,713 and 2,790,088, granted June 9, 1953, and April 23, 1957, respectively.

In such devices the P-N junctions have a permanent voltage in the form of a bias applied thereto. Also it has been recognized in the art generally that a capacitive type effect is exhibited at any P-N junction. However, it has not been recognized that these phenomena can be combined to provide a solid state storage device which is sensitive to light in both the visible and invisible regions.

I have observed that when a P-N junction is reverse biased and the bias then removed a certain length of time is required before the voltage across the P-N junction returns to zero. Also the length of time required for voltage across the P-N junction to return to zero is substantially different when the P-N junction is shielded from illumination than it is when the P-N junction has illumination incident thereon; the total quantity of illumination incident on said junction being a determinating factor.

The length of time required for the voltage across the P-N junction to return to equilibrium can be made relatively long; depending upon the bias voltage, the material used, the method of forming the junction, and any other parameter that contributes to the back resistance of the junction in general; and since the length of time so required can be substantially affected by incident illumination, such a device can be utilized in present systems such as in an image tube target for use in a Vidicon type television camera or in a storage tube similar to a barrier grid storage type tube. However, such a device with its storage effect and the sensitivity to illumination thereof may have numerous uses in systems not here contemplated. As new materials which have larger forbidden gaps are used to form P-N junctions and as methods of forming the junctions improve, longer and longer times can be obtained for the reverse biased P-N junction to return to equilibrium, and hence many more uses of this invention not now feasible will become practical.

The action of a P-N junction as briefly discussed above makes its use as an element in a television camera target possible and also very advantageous. Television camera target elements must be sensitive to illumination and should employ some principle which allows integration of light over one complete frame time. Photons incident on the P-N junction produce minority carriers which aid in the charge decay across the junction and therefore the amount of charge lost in a scanning time, which is short compared to the dark decay time, is proportional to the incident illumination integrated over the scanning time. As an example, dark decay time using a silicon junction has been found to be long enough to satisfy this requirement and therefore the use of the P-N junction in the image tube target is entirely satisfactory. Also one of the very fine properties of such a device is that its maximum sensitivity to various wavelengths of illumination is dependent upon the sensitivity of the particular material used to form the P-N junction. Therefore, a variety of spectral responses for such an image tube target can be obtained by proper selection of the materials forming the P-N junctions and as more and various types of junctions are developed, greater selection in determining the spectral response of the target, and hence the television camera, can be enjoyed.

A mosaic of P-N junctions forming a target in a cathode-ray tube can also be utilized as a storage mechanism where only temporary storage is required, as in the barrier grid storage tube now in use, with the added features that any given element can be cleared with the use of a light beam as well as the electron beam and further the entire array can be quickly cleared by a flash of light of sufficient intensity. In the following not all of the possible uses and particular arrangements of a storage tube utilizing P-N junctions will be discussed but the essential features leading to specific utilization will be set forth.

The invention is explained in more detail hereinafter with reference to the accompanying drawing wherein:

FIG. 1 is a schematic diagram of a circuit utilized to observe the voltage decay or charge storage and the response thereof to changes in illumination incident upon the P-N junction utilized in this invention;

FIG. 2 is a graphical representation of the voltage across the P-N junction under test as shown in FIG. 1 as a function of time after the bias voltage has been removed from the P-N junction for two conditions one with the P-N junction shielded from any illumination and the other with illumination incident thereon;

FIGS. 3 and 4 represent alternative embodiments of the invention wherein an image tube target is formed for use in a device such as a Vidicon television camera tube; and FIG. 5 represents another embodiment of the invention wherein an image tube target is formed in a cathode-ray tube type storage device similar to the barrier grid storage tube now in current use.

FIG. 1 represents a circuit utilized to observe the charge storage sensitivity to illumination of a boron diffused silicon P-N junction 12. The junction 12 is placed in the grid circuit of a cathode follower circuit. An electrometer tube $V_1$ and reasonable precautions against spurious leakage paths are utilized because of the high ($\sim 10^9$ ohm) back resistance of the junction 12. In operation, switch 10 is closed and the junction 12 is biased in the reverse direction to a value equal to $V_B$. Switch 10 is then opened and the decay of voltage or the charge storage effect is then observed by means of an oscilloscope connected to terminals 14 and 16. A typical pattern for the decay of voltage is shown as curve A in FIG. 2. In this case the junction is charged to $V_B$ which is 6 volts and is shielded from room light. The very same process is then repeated but this time when switch 10 is opened room light ($\sim 15$ foot candles) is permitted to fall upon the P-N junction 12 and the decay is shown in FIG. 2 as curve B. Only slight changes in shape and scale are observed when junctions formed by other methods are used such as those alloyed or grown. As can be seen a very substantial effect on charge storage occurs when illumination is incident on the P-N junction and although it is not evident from curve B of FIG. 2 the effect on charge storage by light incident on the P-N junction is proportional to the total quantity of light incident on the junction or in other words proportional to the change in incident light on the junction as will be more fully described.

A general explanation of the above-observed effects associated with the P-N junction of FIG. 1 will now be given. For a more detailed explanation of current flow across a P-N junction see "Electron and Holes in Semiconductors" by William Shockley. In the P zone of the unbiased P-N junction there is a net negative charge present as ionized acceptors. This bound charge gives rise to the change in electrostatic potential which occurs at the junction between the N and P regions. When the junction is biased in the reverse direction, the number of uncompensated ionized acceptors in the P zone and donors in the N zone increases. If the bias supply is now removed and no other connections are made to the junction, the number of uncompensated ionized acceptors and donors will decrease to the normal unbiased value. The decay to the equilibrium condition will take place by the transfer of negative charge from the P zone to the N zone and positive charge from the N zone to the P zone. Such a charge transfer takes place by means of the reverse saturation current, which is limited by the rate of minority carrier generation. However, the decay conditions when the junction is being illuminated are not the same as when the junction is in the dark. When the junction is illuminated, the absorbed photons produce hole-electron pairs which can add measurably to the transfer of charge across the junction. If the intensity of the illumination is strong enough, the decay current will be essentially a constant equal to the photo current of the junction, that is, the decay current will be mainly composed of the current caused by the photons incident on the P-N junction. The length of time required for any given P-N junction to return to its unbiased condition is dependent upon the total bias voltage applied across the junction, the materials which comprise the junction, the method of forming the junction, the quantity of illumination incident upon the junction, and generally all the parameters that contribute to the back resistance of the junction.

FIGS. 3 and 4 illustrate television pickup tube targets which make use of the charge storage and sensitivity to illumination thereof of reverse biased P-N junctions.

Consider FIG. 3 which represents a section through a rectangular array of bosses on a silicon plate, the bosses being of one conductivity type, illustrated here as P type, while the plate is of the other, illustrated here as N type. The junction structure might be made by alloy, remelt, diffusion, or thermal conversion of the surface layer of a slice of silicon, while the mechanical form could be produced by sawing.

In operation, each boss is charged to a predetermined value, say, 100 volts reverse with respect to the base plate, that is, the voltage is applied with a polarity such that current would flow in the circuit in the direction of high resistance each time the scanning beam of FIG. 3 is focused on that particular boss. During the scanning interval the voltage across the boss to plate or P-N junction decays at a particular rate if in the dark and at a much faster rate if the P-N junction is illuminated, the rate in this latter instance depending upon the intensity of the incident illumination on the P-N junction. It has been found that both these rates appear ideal for operation in a storage mode where the frame repetition rate is 30 per second. During the scanning interval the light incident on the P-N junction increases the rate of decay of voltage across the junction, as has been stated, and the decay rate is proportional to the incident light and, therefore, when any particular element has the beam refocused on it, the number of electrons required to charge the junction to the cathode potential causes a voltage to appear across a resistor 18 which is proportional to the light incident on the junction during the scanning interval.

The light image of the object to be transmitted may be projected upon the target from either side, as long as the junction is close enough to the illuminated side so that minority carriers generated in the surface layers by the absorption of light may reach the junction.

Let us now consider FIG. 4 where instead of having a target with island bosses such as that shown in FIG. 3, the same effect is obtained with a target having islands of opposite conductivity type within one of the surfaces. In FIG. 4 the base plate is N type and the islands are P type but this is a matter of mere choice. Such a target as that shown in FIG. 4 could be made by sprinkling the surface with particles of a doping agent through a fine mesh screen and then heating to produce an array of island diffusion junctions.

The P-N junction storage element can also be of use in a cathode-ray storage tube similar to the barrier grid storage tube. FIG. 5 illustrates how the device would be constructed and there is shown therein an electron gun for forming a beam of electrons, a target 20 comprising a backing plate of material of N-type conductivity 26 with bosses of P-type material 22 affixed thereto forming a mosaic of P-N junctions, resistor 24 across which read-out voltage is obtained, a lamp or illumination source 30, a lens 28 for concentrating a beam of light produced by the lamp 30, and a source for producing a flash of light 32. In operation, as in the barrier grid storage tube, the elements (i.e., the P-N junctions forming the mosaic target) can have either a charge which will be called a "1" or no charge which will be called a "0." The write-in is accomplished with the electron beam formed by the electron gun charging the element to cathode potential for a "1" or not charging the element for a "0." To read out, the beam is brought back to the particular element and the amount of charge, or number of electrons, necessary to bring the element to cathode potential is observed as a voltage pulse across resistor 24. Thus an element with a "1" state will give no voltage pulse while a "0" state will give a voltage pulse. The read-out of a "0" state is destructive. It must be remembered that the charge across the P-N junction begins to decay as soon as the electron beam is focused on another element and therefore the charge storage wil not be as long as that in the present barrier grid storage tube but as was mentioned earlier further developments in P-J junctions will make the P-N junction storage element practical for more and more applications. However, the added desirable features accruing from the use of these P-N junctions in place of the barrier grid, as will be discussed below, make this application to storage tubes of practical importance.

In the normal barrier grid tube the only way of changing the state of an element involves the use of the electron beam, while with this proposal a light beam such as that produced by lamp 30 and lens 28 can also be used to change a "1" to a "0." Another feature is that an "erase beam" is used in the barrier grid storage tube to clear the target and this requires the scanning of every element. However, all that is needed here is a flash of light of sufficient intensity and all the elements would be clear or in a "0" state. Such a flash could occur in times of the order of microseconds and can be produced by any high intensity flash lamp.

What is claimed is:

1. A storage element comprising a P-N junction which exhibits a capacitive effect having a time constant variable with the quantity of illumination on said junction, potential means for applying a unidirectional signal pulse having a time duration short with respect to the time constant of said junction to be stored across said junction, and selectively operated illumination means incident upon said P-N junction for erasing any signal stored thereon.

2. A storage device comprising an array of P-N junctions, means for controlling an electron beam such that any particular P-N junction in said array can be selectively reverse biased, circuit means for detecting whether said chosen P-N junction is still reverse biased from a previous application of reverse bias, and means for controlling a light beam such that any particular P-N junction can be selectively placed in an unbiased condition.

3. A storage device as claimed in claim 2 including illumination means for changing every reversed biased P-N junction in said array to its unbiased condition simultaneously.

4. A storage device comprising an array of P-N junctions, means for selectively applying a noncontinuous unidirectional reverse biasing potential to any of said junctions, circuit means for detecting whether the chosen junction is still reverse biased from a previous application of biasing potential, means for selectively applying a light beam on any of said junctions to change any biased junction to its unbiased state, and means for applying illumination to said array of junctions simultaneously, thereby causing all of said junctions to be in their unbiased state.

References Cited in the file of this patent

UNITED STATES PATENTS

| | | |
|---|---|---|
| 2,582,850 | Rose | Jan. 15, 1952 |
| 2,588,254 | Lark-Horovitz et al. | Mar. 4, 1952 |
| 2,641,712 | Kircher | June 9, 1953 |
| 2,641,713 | Shive | June 9, 1953 |
| 2,669,635 | Pfann | Feb. 16, 1954 |
| 2,790,088 | Shive | Apr. 23, 1957 |
| 2,886,739 | Matthews et al. | May 12, 1959 |
| 2,890,359 | Heijne et al. | June 9, 1959 |